(12) United States Patent
Jivraj et al.

(10) Patent No.: US 11,727,393 B2
(45) Date of Patent: Aug. 15, 2023

(54) STORED-VALUE CARD SYSTEM

(71) Applicant: The Toronto-Dominion Bank, Toronto (CA)

(72) Inventors: Salim Jivraj, North York (CA); Lawrence Gar Chee Wong, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 31 days.

(21) Appl. No.: 16/929,747

(22) Filed: Jul. 15, 2020

(65) Prior Publication Data
US 2020/0349557 A1 Nov. 5, 2020

Related U.S. Application Data

(63) Continuation of application No. 15/288,340, filed on Oct. 7, 2016, now Pat. No. 10,748,141.

(60) Provisional application No. 62/289,688, filed on Feb. 1, 2016.

(51) Int. Cl.
| G06Q 20/36 | (2012.01) |
| G06Q 20/10 | (2012.01) |
| G06Q 20/40 | (2012.01) |
| G06Q 40/12 | (2023.01) |
| G06Q 20/20 | (2012.01) |
| G07F 7/10  | (2006.01) |
| G06Q 20/34 | (2012.01) |
| G06Q 20/32 | (2012.01) |

(52) U.S. Cl.
CPC ....... *G06Q 20/3674* (2013.01); *G06Q 20/102* (2013.01); *G06Q 20/20* (2013.01); *G06Q 20/202* (2013.01); *G06Q 20/204* (2013.01); *G06Q 20/322* (2013.01); *G06Q 20/3278* (2013.01); *G06Q 20/341* (2013.01); *G06Q 20/40* (2013.01); *G06Q 20/4037* (2013.01); *G06Q 40/128* (2013.12); *G07F 7/1008* (2013.01)

(58) Field of Classification Search
None
See application file for complete search history.

(56) References Cited

U.S. PATENT DOCUMENTS

| 7,290,704 B1 * | 11/2007 | Ball | G06Q 20/204 235/382 |
| 7,600,673 B2 * | 10/2009 | Stoutenburg | G06Q 20/04 235/380 |
| 10,262,321 B1 * | 4/2019 | Ramanathan | G06Q 20/3829 |

(Continued)

*Primary Examiner* — Fateh M Obaid
(74) *Attorney, Agent, or Firm* — Graham Patent Law

(57) ABSTRACT

A stored-value card system includes a POS terminal, a communications device, and a stored-value card agent. The stored-value card agent is configured to receive, from the communications device, a message that identifies a payment amount; transmit, to a stored-value card network, a request message that includes the payment amount; receive a confirmation of the stored-value card network associating the payment amount with a stored-value card account that is maintained by the stored-value card network; and transmit a token to the communications device. The POS terminal is configured to transmit to the stored-value card network a completion message that includes the token and excludes the payment amount, and receive from the stored-value card network an authorization code that confirms authorization of a funds transfer in the payment amount.

18 Claims, 8 Drawing Sheets

(56) References Cited

U.S. PATENT DOCUMENTS

| | | | | |
|---|---|---|---|---|
| 11,120,428 B2* | 9/2021 | Glass | ............... | G06Q 20/354 |
| 2002/0153414 A1* | 10/2002 | Stoutenburg | ............... | G06Q 30/06 |
| | | | | 235/380 |
| 2006/0213980 A1* | 9/2006 | Geller | ............... | G06Q 20/10 |
| | | | | 235/380 |
| 2009/0254447 A1* | 10/2009 | Blades | ............... | G06Q 30/0601 |
| | | | | 705/40 |
| 2009/0327134 A1* | 12/2009 | Carlson | ............... | G06Q 20/3223 |
| | | | | 705/44 |
| 2012/0053958 A1* | 3/2012 | Marshall | ............... | G06Q 30/02 |
| | | | | 705/2 |
| 2013/0346305 A1* | 12/2013 | Mendes | ............... | G06Q 20/351 |
| | | | | 705/41 |
| 2014/0149198 A1* | 5/2014 | Kim | ............... | G06Q 30/0226 |
| | | | | 705/14.27 |
| 2016/0239838 A1* | 8/2016 | Yang | ............... | G06Q 20/40 |
| 2016/0321663 A1* | 11/2016 | Batlle | ............... | G06Q 20/405 |
| 2017/0200137 A1* | 7/2017 | Vilmont | ............... | G06Q 30/0213 |
| 2019/0159052 A1* | 5/2019 | Wolcott | ............... | H04W 4/80 |

* cited by examiner

STORED-VALUE CARD SYSTEM

RELATED APPLICATIONS

This patent application is a continuation application of U.S. patent application Ser. No. 15/288,340, filed Oct. 7, 2016, which claims the benefit of the filing date of U.S. Patent Application Ser. No. 62/289,688, filed Feb. 1, 2016, the contents of both of which are incorporated herein by reference.

FIELD OF THE INVENTION

This patent application relates to a method and apparatus for processing requests in a stored-value card system.

BACKGROUND

Stored-value cards (also known as gift cards) allow consumers to make purchases anonymously at participating merchants. In a closed-loop stored-value card network, a pre-paid funds balance is stored locally on the stored-value card. In an open-loop stored-value card network, the pre-paid funds balance for each card is stored on a database remote from the merchant's point-of-sale terminals. When a stored-value card is presented to a merchant to effect payment for a transaction, software installed on the merchant's point-of-sale terminal reduces the pre-paid funds balance associated with the card by deducting all or a portion of the required payment from the balance, as stored on the card or in the remote database.

Although the pre-paid funds balance associated with a stored-value card can be replenished via a merchant's acquirer network, to maintain anonymity of the stored-value card user the stored-value card network is kept separate from the merchant's acquirer network. Therefore, the stored-value card network does not have any information that can be used to identify the stored-value card user. As a result, a stored-value card user cannot withdraw funds from a stored-value card account after those funds have been deposited with the stored-value card network.

SUMMARY

This patent application describes a stored-value card agent and associated method that processes withdrawals and transfers from a stored-value card network via a ledger that is maintained separate from the stored-value card network and payment networks.

In accordance with a first aspect of the disclosure, there is provided a stored-value card agent that includes a network interface, ledger database, and a card processor. The network interface is configured to interface the stored-value card agent with a wallet client and a computer server. The ledger database is maintained separate from the computer server.

The card processor is configured to (i) receive from the wallet client a deposit request identifying a deposit amount, (ii) effect an electronic funds transfer of the deposit amount to a first account that is maintained by the computer server by transmitting a deposit authorization to the computer server, and (iii) configure a ledger with the deposit amount by associating in the ledger database a current balance value for the ledger with the deposit amount. The ledger is uniquely associated with the wallet client in the ledger database.

In accordance with the first aspect of the disclosure, the card processor is also configured to (iv) receive from the wallet client a withdrawal request identifying a withdrawal amount, (v) determine from the ledger database the current balance value in the ledger uniquely associated with the wallet client, (vi) confirm that the current balance value is at least equal to the withdrawal amount, (vii) reduce the current balance value in the ledger by the withdrawal amount, and (viii) initiate an electronic funds transfer of the withdrawal amount from the first account to a second account that is associated with the wallet client by transmitting to the computer server a transfer request identifying the withdrawal amount.

In accordance with a second aspect of the disclosure, there is provided a method of withdrawing funds from a stored-value card network. The method involves (i) receiving from a wallet client a deposit request identifying a deposit amount, (ii) effecting an electronic funds transfer of the deposit amount to a first account that is maintained by a computer server, and (iii) configuring a ledger with the deposit amount in a computer-readable memory separate from the computer server. The ledger is uniquely associated with the wallet client in the computer-readable memory. The effecting an electronic funds transfer of the deposit amount involves transmitting a deposit authorization to the computer server. The configuring the ledger with the deposit amount involves associating a current balance value for the ledger with the deposit amount.

In accordance with the second aspect of the disclosure, the method also involves (iv) receiving from the wallet client a withdrawal request identifying a withdrawal amount and, in response to the receiving a withdrawal request, (v) determining from the computer-readable memory the current balance value in the ledger uniquely associated with the wallet client, (vi) confirming that the current balance value is at least equal to the withdrawal amount, (vii) reducing the current balance value in the ledger by the withdrawal amount, and (viii) initiating an electronic funds transfer of the withdrawal amount from the first account to a second account that is associated with the wallet client. The first account has a balance amount at least equal to the withdrawal amount. The initiating an electronic funds transfer of the withdrawal amount involves transmitting to the computer server a transfer request identifying the withdrawal amount.

In accordance with a third aspect of the disclosure, there is provided a non-transient computer-readable medium that carries computer processing instructions stored thereon which, when executed by a computer, cause the computer to perform a sequence that involves (i) receiving from a wallet client a deposit request identifying a deposit amount, (ii) effecting an electronic funds transfer of the deposit amount to a first account that is maintained by a computer server, and (iii) configuring a ledger with the deposit amount in a computer-readable memory separate from the computer server. The ledger is uniquely associated with the wallet client in the computer-readable memory. The effecting an electronic funds transfer of the deposit amount involves a deposit authorization to the computer server. The configuring a ledger with the deposit amount involves associating a current balance value for the ledger with the deposit amount.

In accordance with the third aspect of the disclosure, the sequence also involves (iv) receiving from the wallet client a withdrawal request identifying a withdrawal amount and, in response to the receiving a withdrawal request, (v) determining from the computer-readable memory the current balance value in the ledger uniquely associated with the wallet client, (vi) confirming that the current balance value is at least equal to the withdrawal amount, (vii) reducing the current balance value in the ledger by the withdrawal amount, and (viii) initiating an electronic funds transfer of the withdrawal amount from the first account to a second account that is associated with the wallet client. The first account has a balance amount at least equal to the withdrawal amount. The effecting an electronic funds transfer of the withdrawal amount involves to the computer server a transfer request identifying the withdrawal amount.

In accordance with a fourth aspect of the disclosure, there is provided a method of withdrawing funds from a stored-value card network. The method involves a card processor maintaining in a computer-readable memory a plurality of ledgers each uniquely associated with a respective wallet client in the computer-readable memory. Each said ledger stores a respective current balance value.

The method involves the card processor receiving from one of the wallet clients, via a communications network, a transaction payment request that identifies a payment amount and requests authorization for an anonymous electronic payment with a point-of-sale terminal in the payment amount, and receiving from the one wallet client via the communications network a withdrawal request identifying a withdrawal amount.

In accordance with the fourth aspect of the disclosure, the method involves, in response to the card processor receiving the transaction payment request, the card processor (i) determining from the computer-readable memory the current balance value in the ledger uniquely associated with the one wallet client, (ii) confirming that the current balance value is at least equal to the payment amount, (iii) reducing the current balance value in the ledger by the payment amount, and (iv) providing the authorization for an anonymous electronic payment by initiating an electronic funds transfer of the payment amount from a first account to a stored-value card account that is maintained by a stored-value card network. The first account has a balance amount at least equal to the payment amount.

In accordance with the first aspect of the disclosure, the method involves, in response to the card processor receiving the withdrawal request, the card processor (v) determining from the computer-readable memory the current balance value in the ledger uniquely associated with the one wallet client, (vi) confirming that the current balance value is at least equal to the withdrawal amount, (vii) reducing the current balance value in the ledger by the withdrawal amount, and (viii) initiating an electronic funds transfer of the withdrawal amount from the first account to a second account that is associated with the one wallet client. The balance of the first account is at least equal to the withdrawal amount.

Since the ledgers are maintained separate from the stored-value card network and payment networks, the consumer can withdraw funds from the stored-value card system, and transfer funds within the stored-value card system (subject to the current balance value) notwithstanding the technological limitations of the stored-value card network and without contravening the anonymity requirements of the stored-value card network.

BRIEF DESCRIPTION OF THE DRAWINGS

An exemplary stored-value card system, stored-value card agent, and method of stored-value card processing will now be described, with reference to the accompanying drawings, in which.

DETAILED DESCRIPTION

Stored-Value Card System—Overview

Figure 1:
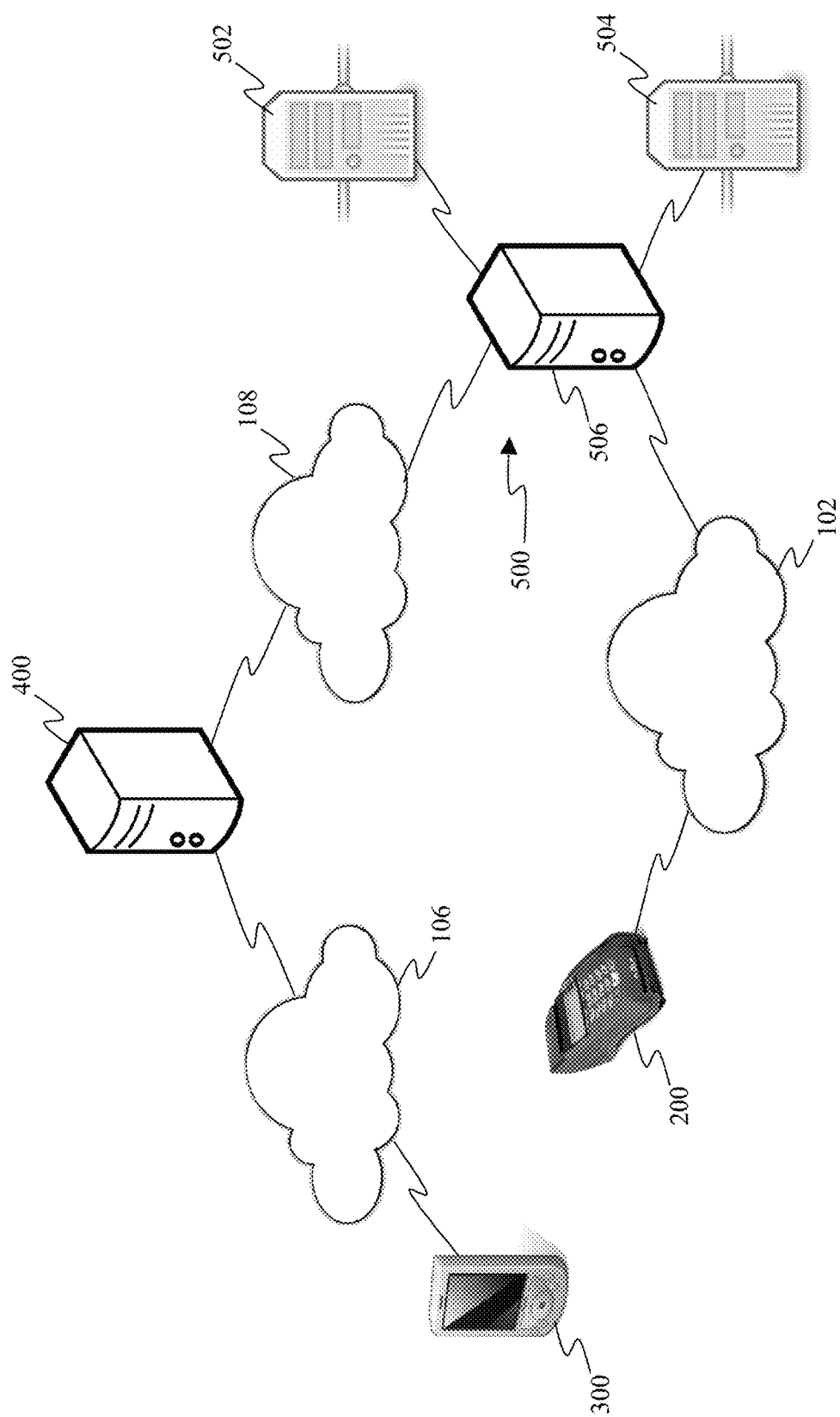
FIG. 1 is a schematic view of the stored-value card system, depicting a plurality of point-of-sale terminals, a plurality of point portable communications devices, a stored-value card agent, and a stored-value card network.

FIG. 1 is a schematic view of a stored-value card system, denoted generally as 100. As shown, the stored-value card system 100 comprises a plurality of point-of-sale (POS) terminals 200, a plurality of portable communications devices 300, a stored-value card agent 400, and a stored-value card network 500. Although the stored-value card system 100 is shown comprising only a single POS terminal 200 and a single portable communications device 300, the stored-value card system 100 typically comprises a plurality of the POS terminals 200 and a plurality of the portable communications devices 300.

POS Terminal

Figure 2:
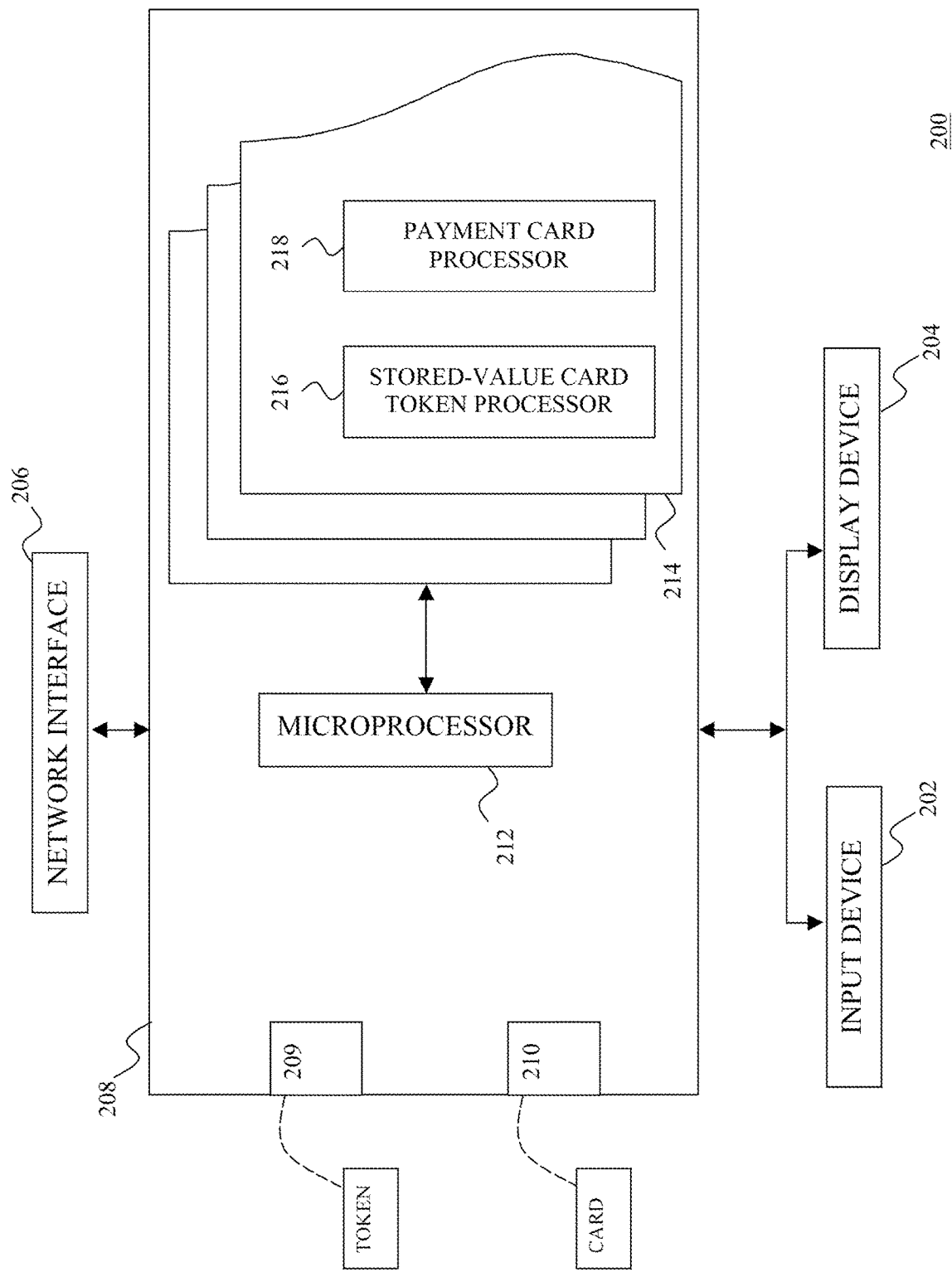
FIG. 2 is a schematic view of one of the point-of-sale terminals.

As shown in FIG. 2, each POS terminal 200 includes a user interface/input device 202, a display device 204, a network interface 206, and a data processing system 208 connected to the input device 202, the display device 204 and the network interface 206. The user input device 202 may be implemented as a keyboard, touchpad, and/or touchscreen and/or other input device suitable for allowing an operator of the POS terminal 200 to input data and/or commands into the POS terminal 200. The display device 204 may comprise a liquid crystal display (LCD) panel, cathode ray tube (CRT) display, plasma display panel, and/or paper printer and/or other output device suitable for displaying information to the operator of the POS terminal 200.

Each POS terminal 200 may also include a token reader 209 that allows the POS terminal 200 to read/scan digital stored-value card tokens, and a card reader 210 that allows the POS terminal to read/scan payment cards (e.g. debit cards, credit cards). Alternately, the POS terminal 200 may be connected to peripheral devices that include the token reader 209 and the card reader 210. As non-limiting examples, the stored-value card token may include a stored-value card number imbedded/encoded therein, and may be provided to the POS terminal 200 as an image ((e.g. a two-dimensional bar code (QR code)) or a tone sequence.

The network interface 206 interfaces the POS terminal 200 with a wide area computing network 102 that allows the POS terminal 200 to communicate with the stored-value card network 500. The network interface 206 also interfaces the POS terminal 200 with a secure payment network (not shown) that allows the POS terminal 200 to communicate with the merchant's financial institution ("acquirer") server (not shown). As will be explained, the POS terminal 200 uses the wide area computing network 102 to authorize financial transactions that are initiated with digital stored-value card tokens which the POS terminal 200 receives from portable communications devices 300 (via the token reader 209), and uses the secure payment network to authorize financial transactions that are initiated with payment cards that are interfaced with the POS terminal 200 (via the card reader 210).

The data processing system 208 may include a microprocessor 212 and a non-transient computer-readable medium 214. The computer-readable medium 214 may be provided as electronic computer memory (e.g. flash memory, optical or magnetic memory (e.g. compact disc, hard disk) that may store one or more credentials that the POS terminal 200 can use to authenticate to the merchant's acquirer server, and cryptographic payment keys that the POS terminal 200 uses to securely send payment authorization requests to (and receive authorization responses from) the merchant's acquirer server.

The memory 214 may also store computer processing instructions stored thereon which, when executed by the microprocessor 212, define an operating system (not shown) that allows the POS terminal 200 to accept user input from the input device 202 and to control the display device 204, and the token reader 209 and the card reader 210. In one example, the computer processing instructions also define a stored-value card token processor 216 that allows the operator of the POS terminal 200 to request payment (via the computing network 102) for a financial transaction initiated with a digital stored-value card token, and a payment card processor 218 that allows the operator of the POS terminal 200 to request authorization (via the payment network) for a financial transaction initiated with a payment card.

Portable Communications Device

Figure 3:
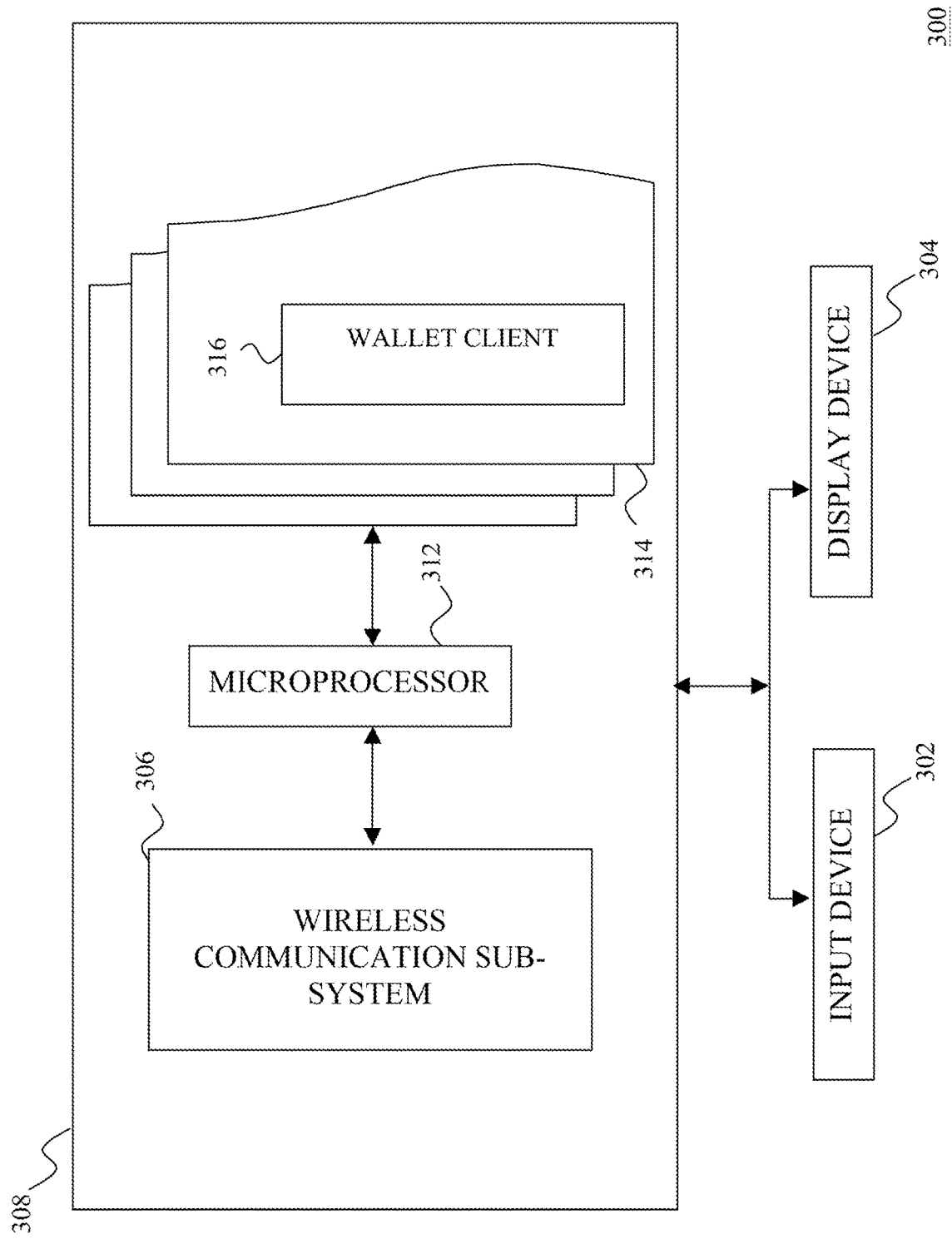
FIG. 3 is a schematic view of one of the portable communications devices.

As shown in FIG. 3, each portable communications device 300 includes a user interface/input device 302, a display device 304, and a data processing system 308 connected to the input device 302 and the display device 304. The user input device 302 may be implemented as a keyboard, touchpad, and/or touchscreen and/or other input device suitable for allowing an operator of the portable communications device 300 to input data and/or commands into the portable communications device 300. The display device 304 may comprise a liquid crystal display (LCD) panel and/or other output device suitable for displaying information to the operator of the portable communications device 300.

The portable communications device 300 may be implemented as a wireless communications device. Therefore, the portable communications device 300 may include a wireless communication subsystem 306 that interfaces the portable communications device 300 with a wide area wireless communications network 106 that allows the portable communications device 300 to communicate with the stored-value card agent 400 and optionally other computer resources (e.g. financial institution servers). The wide area network 106 may be configured as a WiFi network, a cellular network, or a combination thereof. As will be explained, the portable communications device 300 uses the wide area wireless network 106 to request and receive digital stored-value card tokens from the stored-value card agent 400.

The wireless communication subsystem 306 may also interface the portable communications device 300 with a local area wireless communications network (not shown) that allows the portable communications device 300 to communicate with POS terminals 200 that are in close proximity to the portable communications device 300, using local modes of communication (e.g. optical, infrared, Bluetooth and/or Near Field Communications (NFC).) As will be explained, the portable communications device 300 uses the local area wireless network to provide the local POS terminals 200 with the digital stored-value card tokens.

The data processing system 308 may include a microprocessor 312 and a non-transient computer-readable medium 314. The computer-readable medium 314 may be provided as electronic computer memory (e.g. FLASH memory) that may store a unique device identifier that the portable communications device 300 can use to authenticate to the stored-value card agent 400.

The memory 314 may also store computer processing instructions stored thereon which, when executed by the microprocessor 312, define an operating system (not shown) that allows the portable communications device 300 to accept user input from the input device 302, control the display device 304, and access computer resources via the wide area wireless network 106 and the local area wireless communications network.

The computer processing instructions may also define a wallet client 316 that allows the portable communications device 300 to request and receive (via the wide area wireless network 106) digital stored-value card tokens from the stored-value card agent 400, and to provide the local POS terminals 200 with the digital stored-value card tokens (via the local area wireless network). Although the wallet client 316 is typically implemented as computer processing instructions, all or a portion of the functionality of the wallet client 316 may be implemented instead in electronics hardware, such as a field programmable logic gate array (FPGA) or a complex programmable logic device (CPLD).

Stored-Value Card Agent

Figure 4:
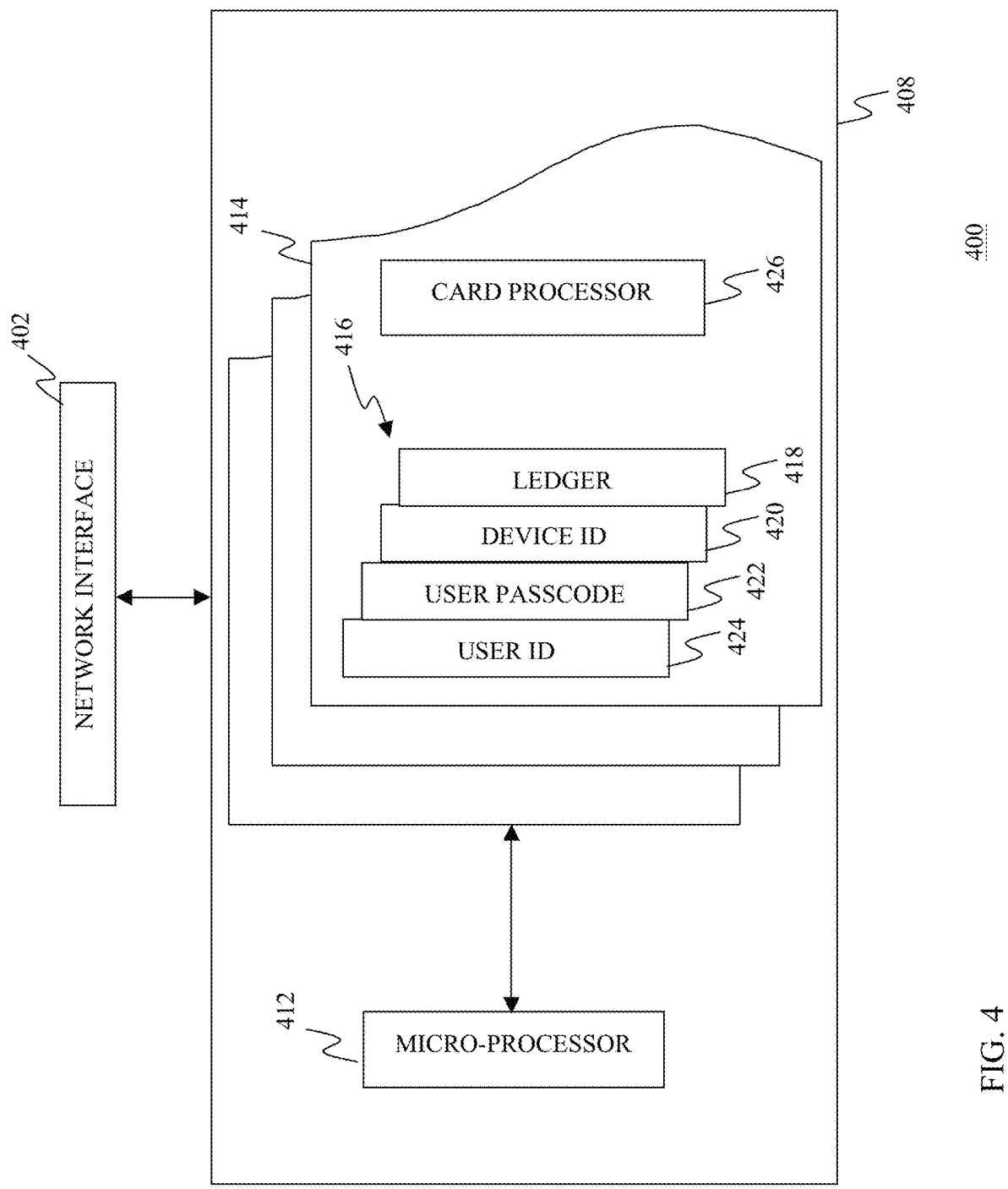
FIG. 4 is a schematic view of the stored-value card agent.

As shown in FIG. 4, the stored-value card agent 400 may be implemented as a computer server, and may include a network interface 402 and a data processing system 408 that is coupled to the network interface 402. The network interface 402 interfaces the stored-value card agent 400 with the wide area wireless communications network 106 and allows the stored-value card agent 400 to communicate with the portable communications devices 300. As noted above, the stored-value card agent 400 uses the wide area wireless communications network 106 to provide the portable communications devices 300 with digital stored-value card tokens (subject to the current balance value) in response to token requests received from the portable communications devices 300.

The network interface 402 also interfaces the stored-value card agent 400 with a wide area computing network 108 that allows the stored-value card agent 400 to communicate with the stored-value card network 500 and with the financial institution servers that are associated with one or more financial institutions. As will be explained, the stored-value card agent 400 uses the wide area computing network 108 to request digital stored-value card tokens from the stored-value card network 500, and to request electronic funds transfers to the financial institution accounts that are maintained by the financial institutions (user financial institutions) on behalf of the users of the portable communications devices 300.

The data processing system 408 may include one or more microprocessors 412 and a non-transient computer-readable medium 414. The computer-readable medium 414 may be provided as electronic computer memory (e.g. flash memory) or optical or magnetic memory (e.g. compact disc, hard disk), and may store a ledger database 416 that includes groups of related database records each associated with a respective wallet client 316 (and, therefore, the user of the respective portable communications device 300). Although the stored-value card agent 400 communicates with the stored-value card network 500, the stored-value card agent 400 maintains the ledger database 416 separate from the stored-value card network 500 and the payment network, and may implement authentication protocols that prohibit computers on the stored-value card network 500 and the payment network from accessing the ledger database 416.

Each record group of the ledger database 416 defines a respective local stored-value card account that the stored-value card agent 400 maintains on behalf of the associated wallet client 316, and includes a ledger 418 that identifies the funds that the associated user may have on deposit with the legal entity that is operating the stored-value card agent 400. Therefore, the ledger 418 may store particulars of all the credit/deposit entries made to the wallet client user's local stored-value card account, and the current value of funds in the wallet client user's local stored-value card account.

Each record group of the ledger database 416 also stores a device identifier 420 that is uniquely associated with the user's wallet client 316 in the ledger database 416. Each device identifier 420 is thereby associated with a respective one of the ledgers 418 in the ledger database 416. As noted, the stored-value card agent 400 may use the device identifier 420 to authenticate the wallet client 316.

Each record group of the ledger database 416 also includes an encrypted representation of a user passcode 422 that the wallet client user uses to authenticate to the stored-value card agent 400, and may also include a wallet client user ID 424 that is uniquely associated with the wallet client user and which the stored-value card agent 400 can use to contact the wallet client user. As non-limiting examples, the wallet client user ID 424 may comprise an email address, a mobile device phone number, or a push-notification service handle. The wallet client user ID 424 is thereby associated with a respective one of the ledgers 418 in the ledger database 416. As will be explained, the stored-value card agent 400 may use the wallet client user ID 424 to transfer funds from the wallet client user's local stored-value card account to a financial institution account (wallet client user's financial institution account) that is maintained by a user financial institution on behalf of the user of the associated wallet client 316.

The computer-readable medium 414 may also store computer processing instructions therein which, when executed by the microprocessor(s) 412, define an operating system (not shown) that controls the overall operation of the stored-value card agent 400. The computer processing instructions may also implement a card processor 426. Although the card processor 426 is typically implemented as computer processing instructions, all or a portion of the functionality of the card processor 426 may be implemented instead in electronics hardware, such as a field programmable logic gate array (FPGA) or a complex programmable logic device (CPLD). Therefore, although the stored-value card agent 400 is typically implemented as a computer server, all or part of the stored-value card agent 400 may be implemented instead using other technologies.

The card processor 426 may receive from one of the wallet clients 316 (via the wide area wireless communications network 106) a deposit request that identifies a deposit amount. The card processor 426 may be configured to (i) effect an electronic funds transfer of the deposit amount to a first account that is maintained by a computer server (e.g. a computer server that maintains a financial institution account on behalf of the legal entity that is operating the stored-value card agent 400) by transmitting a deposit authorization to the computer server, and (ii) configure a ledger 418 with the deposit amount by associating in the ledger database 416 a current balance value for the ledger 418 with the deposit amount. As discussed, the ledger 418 is uniquely associated with the wallet client 316 in the ledger database 416.

The card processor 426 may also receive from the wallet client 316 (via the wide area wireless communications network 106) a withdrawal request that identifies a withdrawal amount. The card processor 426 may be configured to (iii) determine from the ledger database 416 the current balance value in the ledger 418 that is uniquely associated with the wallet client 316, (iv) confirm that the current balance value is at least equal to the withdrawal amount, (v) reduce the current balance value in the ledger 418 by the withdrawal amount, and (vi) initiate an electronic funds transfer of the withdrawal amount from the first account to a second account that is associated with the wallet client 316, by transmitting to the computer server a transfer request that identifies the withdrawal amount.

The card processor 426 may receive from one of the wallet clients 316 (via the wide area wireless communications network 106) a transaction payment request that identifies a payment amount and requests authorization for an anonymous electronic payment with a point-of-sale terminal in the payment amount. The card processor 426 may be configured to (i) determine (from the ledger database 416) the current balance value in the ledger 418 that is uniquely associated with the wallet client 316, and (ii) confirm that the current balance value is at least equal to the payment amount.

If the card processor 426 confirms that the current balance value is at least equal to the payment amount, the card processor 426 (iii) reduces the current balance value in the ledger 418 (that is associated with the wallet client 316) by the payment amount, and (iv) provides the authorization for an anonymous electronic payment by initiating an electronic funds transfer of the payment amount from a first account (having a balance amount at least equal to the payment amount) to a remote stored-value card account that is maintained by the stored-value card network 500.

The card processor 426 may also receive from the wallet client 316 (via the wide area wireless communications network 106) a withdrawal request that identifies a withdrawal amount. The card processor 426 is configured to (i) determine (from the ledger database 416) the current balance value in the ledger 418 that is uniquely associated with the wallet client 316, and (ii) confirm that the current balance value is at least equal to the withdrawal amount.

If the card processor 426 confirms that the current balance value is at least equal to the withdrawal amount, the card processor 426 (iii) reduces the current balance value in the ledger 418 (that is associated with the wallet client 316 in the ledger database 416) by the withdrawal amount, and (iv) initiates an electronic funds transfer of the withdrawal amount from the first account (the balance of the first account being at least equal to the withdrawal amount) to a second account that is associated with the wallet client 316.

The card processor 426 may receive from one of the wallet clients 316 (via the wide area wireless communications network 106) a payment transfer request that identifies a transfer amount and particulars of a transferee. The card processor 426 may be configured to (i) determine from the ledger database 416 the current balance value in the ledger that is uniquely associated with the one wallet client 316, and (ii) confirm that the current balance value is at least equal to the transfer amount.

If the card processor 426 confirms that the current balance value is at least equal to the transfer amount, the card processor 426 (iii) reduces the current balance value in the ledger 418 by the transfer amount, (iv) adds to the ledger database 416 an additional one of the ledgers, (v) updates the current balance value of the additional ledger 418 to equal the transfer amount, and (vi) in the ledger database 416 uniquely associates a device identifier with the additional ledger 418 and another one of the wallet clients 316.

The card processor 426 may also receive from the other wallet client 316 (via the wide area wireless communications network 106) a withdrawal request that identifies a withdrawal amount. The card processor 426 is configured to (i) determine from the ledger database 416 the current balance value in the ledger 418 that is uniquely associated with the other wallet client 316, and (ii) confirm that the current balance value in the ledger 418 that is uniquely associated with the other wallet client 316 is at least equal to the withdrawal amount.

If the card processor 426 confirms that the current balance value is at least equal to the withdrawal amount, the card processor 426 (iii) reduces by the withdrawal amount the current balance value in the ledger 418 that is uniquely associated with the other wallet client 316, and (iv) initiates an electronic funds transfer of the withdrawal amount from a first account (the first account having a balance amount at least equal to the withdrawal amount) that is maintained by a computer server (e.g. a computer server that maintains a financial institution account on behalf of the legal entity that is operating the stored-value card agent 400) to a second account that is associated with the other wallet client 316, by transmitting to the computer server a funds transfer request that identifies the withdrawal amount.

Stored-Value Card Network

As shown in FIG. 1, the stored-value card network 500 includes a stored-value card database 502, a registered merchant database 504 and a stored-value card processing server 506 that is communication with the stored-value card database 502 and the registered merchant database 504. The stored-value card database 502 includes groups of related database records each associated with a remote stored-value card account that the stored-value card processing server 506 maintains on behalf of a respective stored-value card user. Each record group of the stored-value card database 502 identifies the current value of funds that the associated stored-value card user may have on deposit with the legal entity that is operating the stored-value card network 500.

Each record group of the stored-value card database 502 also stores a unique digital stored-value card token that is uniquely associated with the respective remote stored-value card account. However, to maintain anonymity of the stored-value card user, the stored-value card database 502 and the stored-value card processing server 506 do not maintain any information that can be used to identify the stored-value card users. Therefore, a wallet client user can effect payment from the wallet client user's remote stored-value card account, for a transaction initiated with a merchant, by providing the merchant with a stored-value card token. The merchant can receive their payment for the transaction by using, for example, the merchant's POS terminal 200 to transmit the stored-value card token to the stored-value card processing server 506. However, as the stored-value card network 500 does not maintain information identifying wallet client users (including any information that can be used to authenticate a wallet client user), the stored-value card users cannot withdraw funds from their remote stored-value card accounts. As will become apparent, the ledger database 416, as maintained by the stored-value card agent 400, addresses this limitation of the stored-value card network 500.

The registered merchant database 504 includes groups of related database records each associated with a merchant that is registered with the stored-value card network 500. Each record group of the registered merchant database 504 includes at least the name of the respective merchant, and a merchant ID that is uniquely associated with the merchant in the registered merchant database 504.

Method of Tracking Stored-Value Card Transactions

As discussed, the stored-value card agent 400 (in co-operation with the portable communications device 300 and the stored-value card network 500) implements a method of withdrawing funds from the stored-value card network 500, and a method of transferring funds within the stored-value card network 500. Sample embodiments of these methods will be discussed with reference to FIGS. 5, 6, 7 and 8.

As will be explained, the computer-readable memory 414 of the stored-value card agent 400 is configured with a plurality of ledgers 418. Each ledger 418 is uniquely associated with a respective wallet client 316 in the computer-readable memory 414 and stores a current balance value reflecting the current value of funds that the associated wallet client user may have on deposit with the legal entity that is operating the stored-value card agent 400.

In accordance with a first embodiment of the method, the stored-value card agent 400 receives from one of the wallet clients 316 a deposit request identifying a deposit amount. The stored-value card agent 400 (*i*) effects an electronic funds transfer of the deposit amount to a first account that is maintained by a computer server (e.g. a computer server that maintains a financial institution account on behalf of the legal entity that is operating the stored-value card agent 400) by transmitting a deposit authorization to the computer server, and (ii) configures a ledger 418 with the deposit amount in the computer-readable memory 414 by associating in the computer-readable memory 414 a current balance value for the ledger 418 with the deposit amount.

In accordance with the first embodiment of the method, the stored-value card agent 400 also receives from the wallet client 316 a withdrawal request that identifies a withdrawal amount. The stored-value card agent 400 (iii) determines from the computer-readable memory 414 the current balance value in the ledger 418 that is uniquely associated with the wallet client 316, (iv) confirms that the current balance value is at least equal to the withdrawal amount, (v) reduces the current balance value in the ledger 418 by the withdrawal amount, and (vi) initiates an electronic funds transfer of the withdrawal amount from the first account to a second account that is associated with the wallet client 316, by transmitting to the computer server a transfer request that identifies the withdrawal amount.

In accordance with a second embodiment of the method, the stored-value card agent 400 receives from one of the wallet clients 316 a transaction payment request that identifies a payment amount and requests authorization for an anonymous electronic payment with a point-of-sale terminal in the payment amount. The stored-value card agent 400 (*i*) determines from the computer-readable memory 414 the current balance value in the ledger 418 that is uniquely associated with the wallet client 316, (ii) confirms that the current balance value is at least equal to the payment amount, (iii) reduces the current balance value in the ledger 418 (that is associated with the wallet client 316) by the payment amount, and (iv) provides the authorization for an anonymous electronic payment by initiating an electronic funds transfer of the payment amount from a first account (having a balance amount at least equal to the payment amount) to a remote stored-value card account that is maintained by the stored-value card network 500.

In accordance with the second embodiment of the method, the card processor 426 also receives from the wallet client 316 a withdrawal request that identifies a withdrawal amount. The card processor 426 (i) determines from computer-readable memory 414 the current balance value in the ledger 418 that is uniquely associated with the wallet client 316, (ii) confirms that the current balance value is at least equal to the withdrawal amount, (iii) reduces the current balance value in the ledger 418 (that is associated with the wallet client 316 in the computer-readable memory 414) by the withdrawal amount, and (iv) initiates an electronic funds transfer of the withdrawal amount from the first account (the balance of the first account being at least equal to the withdrawal amount) to a second account that is associated with the wallet client 316.

In accordance with a third embodiment of the method, the stored-value card agent 400 receives from one of the wallet clients 316 a payment transfer request that identifies a transfer amount and particulars of a transferee. The stored-value card agent 400 (i) determines from the computer-readable memory 414 the current balance value in the ledger that is uniquely associated with the one wallet client 316, (ii) confirms that the current balance value is at least equal to the transfer amount, (iii) reduces the current balance value in the ledger 418 by the transfer amount, (iv) adds to the computer-readable memory 414 an additional one of the ledgers, (v) updates the current balance value of the additional ledger 418 to equal the transfer amount, and (vi) in the computer-readable memory 414 uniquely associates a device identifier with the additional ledger 418 and another one of the wallet clients 316.

In accordance with the third embodiment of the method, the stored-value card agent 400 also receives from the other wallet client 316 a withdrawal request that identifies a withdrawal amount. The stored-value card agent 400 (i) determines from the computer-readable memory 414 the current balance value in the ledger 418 that is uniquely associated with the other wallet client 316, (ii) confirms that the current balance value in the ledger 418 that is uniquely associated with the other wallet client 316 is at least equal to the withdrawal amount, (iii) reduces by the withdrawal amount the current balance value in the ledger 418 that is uniquely associated with the other wallet client 316, and (iv) initiates an electronic funds transfer of the withdrawal amount from a first account (the balance of the first account being at least equal to the withdrawal amount) that is maintained by a computer server (e.g. a computer server that maintains a financial institution account on behalf of the legal entity that is operating the stored-value card agent 400) to a second account that is associated with the other wallet client 316, by transmitting to the computer server a funds transfer request that identifies the withdrawal amount.

Method of Tracking Stored-Value Card Transactions: Account Configuration

Figure 6:
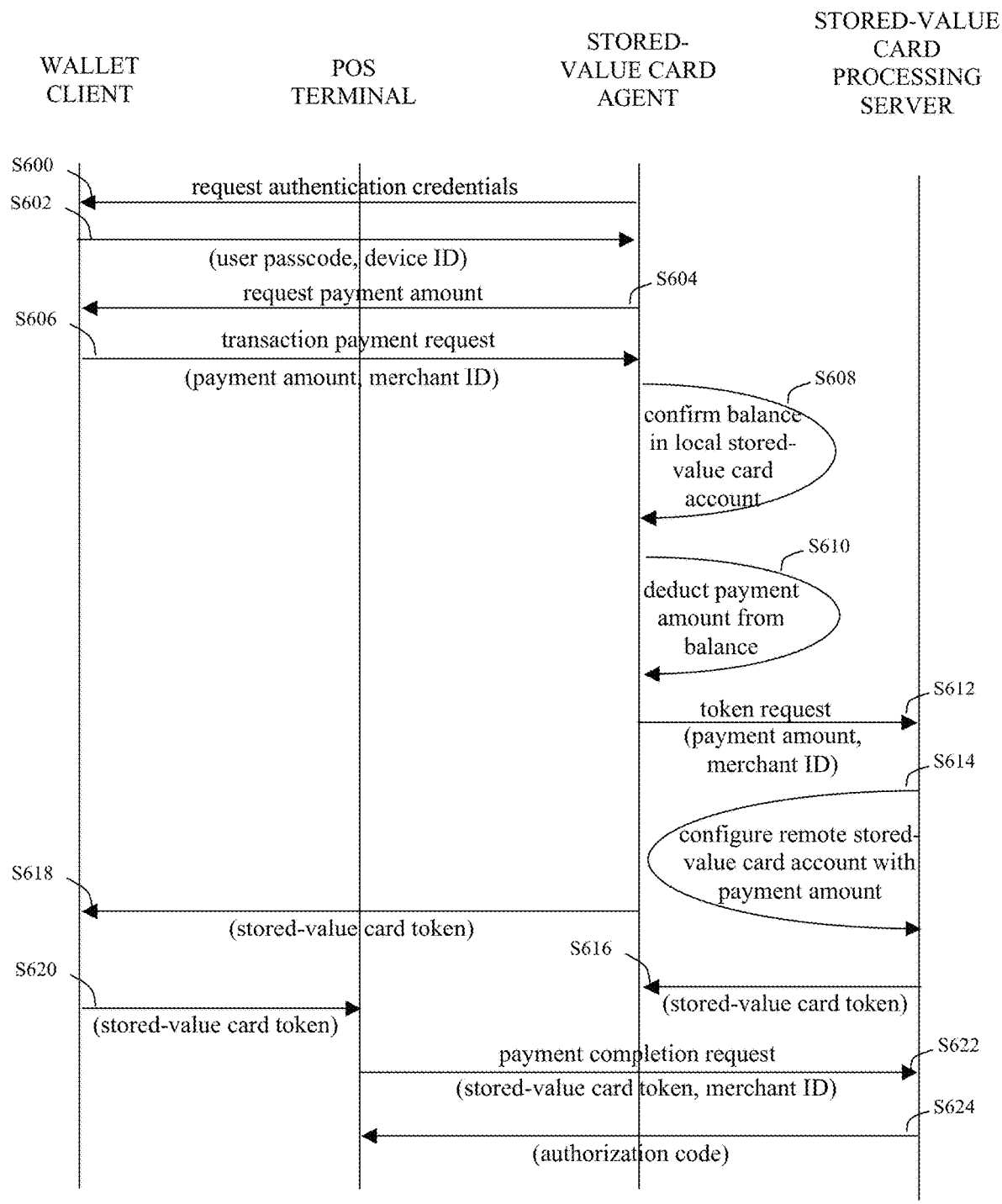
FIG. 6 is a message flow diagram depicting a method of completing a financial transaction with a merchant using a remote stored-value card account that is maintained by the stored-value card network.
Figure 7:
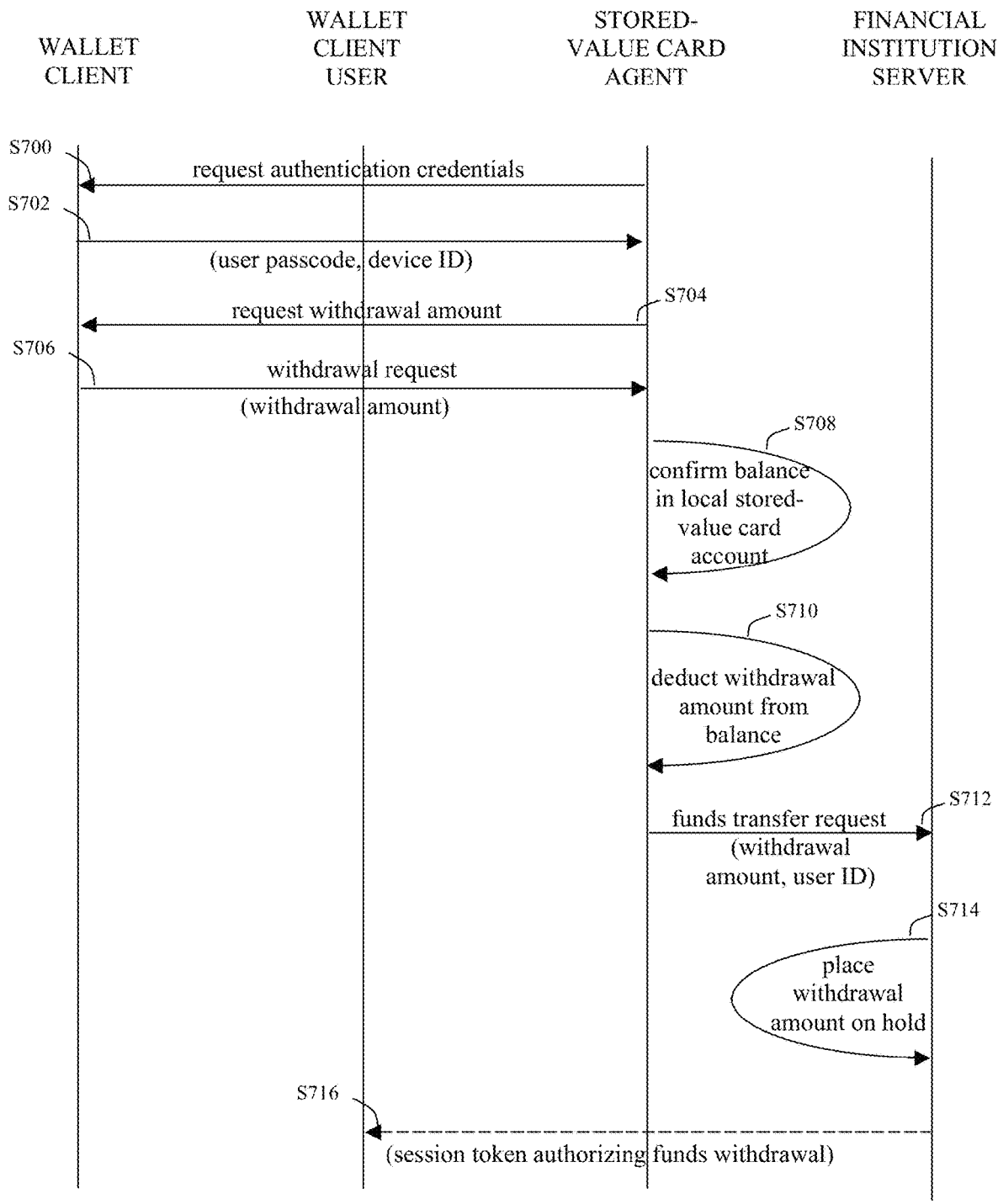
FIG. 7 is a message flow diagram depicting a method of withdrawing funds from a local stored-value card account.
Figure 8:
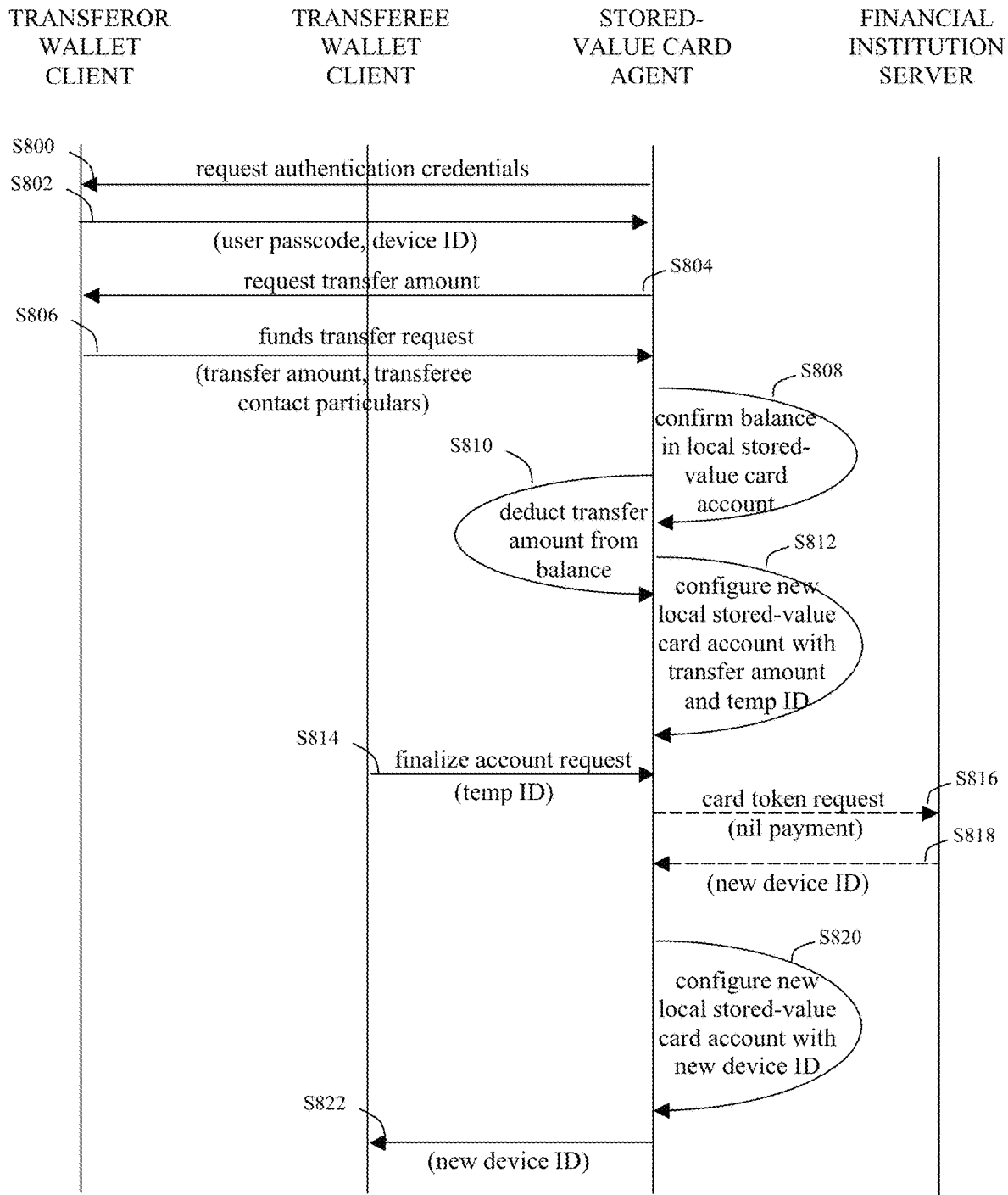
FIG. 8 is a message flow diagram depicting a method of transferring funds between local stored-value card accounts.

An example stored-value card transaction tracking method will be discussed in detail with reference to FIGS. 6 and 7. However, prior to discussing the tracking of transactions, an example method of registering the wallet client user with the stored-value card agent 400 will be discussed in detail with reference to FIG. 5. As will be shown, the registration method involves configuring the wallet client user's local stored-value card account, and depositing funds to the local stored-value card account.

At the outset of the account configuration method, a prospective user (consumer) of the stored-value card network 500 configures the user's portable communications device 300 with the wallet client 316, for example by downloading the wallet client 316 from an online applications server (e.g. App Store™, Google Play™ Blackberry World™) and installing the wallet client 316 to the user's portable communications device 300. The wallet client user may then invoke an open account procedure implemented by the wallet client 316 to thereby open a local stored-value card account with the stored-value card agent 400. In response, the wallet client 316 generates a create account request message requesting a new local stored-value card account for the wallet client user in the ledger database 416, and transmits the create account request message to the stored-value card agent 400 via the wide area wireless communications network 106, at step S500.

After the stored-value card agent 400 receives the create account request message, at step S502 the stored-value card agent 400 creates a new local stored-value card account by creating a new ledger 418 in the ledger database 416, generating a unique device identifier 420, and configuring the new local stored-value card account by saving the device identifier 420 in the ledger database 416 in association with the new ledger 418 (and the wallet client 316). Although the device identifier 420 is thereby uniquely associated with the wallet client 316 (and, therefore, the wallet client user), in one example the device identifier 420 does not include any information that would allow a third party (i.e. other than the stored-value card agent 400) to identify the wallet client user.

The stored-value card agent 400 may ensure that each device identifier is unique by employing any suitable database and/or cryptographic technique known in the art, including generating each device identifier from a pseudo-random number generator or noise generator. Alternately, or additionally, the stored-value card agent 400 may save each device identifier in the ledger database 416 only after confirming that the stored-value card agent 400 has not previously saved the device identifier in the ledger database 416.

Alternately, instead of the stored-value card agent 400 generating the unique device identifier, in one embodiment, at step S504 the stored-value card agent 400 transmits to the stored-value card processing server 506, via the wide area computing network 108, a stored-value card token request message that identifies a nil payment amount and that requests a stored-value card token from the stored-value card network 500. In response, the stored-value card processing server 506 creates a new remote stored-value card account by generating a unique digital stored-value card token (e.g. a unique stored-value card number), and saving the digital stored-value card token in the stored-value card database 502 in association with the nil payment amount.

The stored-value card processing server 506 may ensure that the stored-value card token is unique by employing any suitable database and/or cryptographic technique known in the art, including generating the stored-value card token from a pseudo-random number generator or noise generator. Alternately, or additionally, the stored-value card processing server 506 may save the stored-value card token in the stored-value card database 502 only after confirming that the stored-value card processing server 506 has not previously saved the stored-value card token in the stored-value card database 502.

After saving the digital stored-value card token in the stored-value card database 502, the stored-value card processing server 506 transmits the stored-value card token to the stored-value card agent 400, at step S506. The stored-value card agent 400 configures the new local stored-value card account by saving the stored-value card token in the ledger database 416 as the device identifier 420 in association with the nil payment amount (and in association with the new ledger 418 and the wallet client 316, as discussed above).

After configuring the new local stored-value card account with the unique device identifier 420, at step S508 the stored-value card agent 400 may establish an encrypted communications channel with the wallet client 316 over the wide area wireless communications network 106, and configure the wallet client 316 by transmitting the device identifier to the wallet client 316, over the encrypted communications channel. The wallet client 316 may save the device identifier 420 in the memory 314 of the portable communications device 300.

At step S508, the stored-value card agent 400 may also use the wallet client 316 to prompt the wallet client user to provide a user passcode to subsequently authenticate the wallet client user to the stored-value card agent 400. The stored-value card agent 400 may also prompt the wallet client user to provide a unique electronic address (wallet client user ID) that the wallet client user would like to associate with the local stored-value card account and which the stored-value card agent 400 can use to contact the wallet client user (for example, an e-mail address, mobile device phone number, or push notification service handle to which the stored-value card agent 400 can push a session token that authorizes the wallet client user to make a withdrawal from the balance of funds that the wallet client user may have on deposit with the legal entity that is operating the stored-value card agent 400).

At step S510, the wallet client user inputs the user passcode into the wallet client 316, and the wallet client 316 transmits the user passcode to the stored-value card agent 400, via the encrypted communications channel. If the wallet client user elects to provide the stored-value card agent 400 with the requested wallet client user ID at this stage, at step S510 the wallet client user may also input the requested wallet client user ID into the wallet client 316, and the wallet client 316 may then transmit the requested wallet client user ID to the stored-value card agent 400, via the encrypted communications channel.

At step S512, the stored-value card agent 400 configures the new local stored-value card account with the user passcode (and the wallet client user ID 424, if provided) by encrypting the user passcode and saving the encrypted user passcode 422 (and the wallet client user ID, if provided) in the ledger database 416 in association with the new ledger 418 and the device identifier 420. The open account procedure terminates after the new local stored-value card account is configured with the device identifier 420 and the encrypted user passcode 422 (and optionally with the wallet client user ID 424).

Method of Tracking Stored-Value Card Transactions: Deposit Funds

After the open account procedure terminates, the wallet client user may elect to deposit funds to the local stored-value card account associated with the user's wallet client 316 (wallet client user's local stored-value card account), to thereby allow the wallet client user, for example, to complete financial transactions with merchants (e.g. to purchase goods or services offered for sale, lease or rent by the merchant) using the stored-value card network 500, transfer funds to another wallet client user via the stored-value card network 500, or withdraw funds from the stored-value card network 500. The wallet client user may elect to deposit the funds to the wallet client user's local stored-value card account after the wallet client user physically attends at the premises of a merchant, or before the wallet client users attends at a merchant's premises.

To effect the funds deposit, the wallet client user may use the wallet client 316 to connect to the stored-value card agent 400, and then invoke a funds deposit procedure, implemented by the stored-value card agent 400, to thereby initiate a transfer of funds to the legal entity that is operating the stored-value card agent 400. In response, at step S514 the stored-value card agent 400 may establish an encrypted communications channel with the wallet client 316, and then use the wallet client 316 to prompt the wallet client user to authenticate to the stored-value card agent 400.

At step S516, the wallet client user inputs the user passcode into the wallet client 316, and the wallet client 316 transmits its device identifier (from the memory 314) and the user passcode to the stored-value card agent 400, via the encrypted communications channel. The stored-value card agent 400 authenticates the wallet client user by querying the ledger database 416 with the device identifier to locate the encrypted user passcode 422 that is stored in the local stored-value card account that is associated with the device identifier 420, and comparing the received encrypted user passcode against the encrypted user passcode 422.

If the wallet client user successfully authenticates to the stored-value card agent 400, at step S518 the stored-value card agent 400 may use the wallet client 316 to list one or more available payment modes (e.g. debit card, credit card) and prompt the wallet client user to input the desired funds deposit amount and to identify the payment mode that the wallet client user wishes to use to effect the funds deposit.

The wallet client user uses the wallet client 316 to send to the stored-value card agent 400 a deposit request identifying the desired payment mode and the desired funds deposit amount, at step S520. In response, the stored-value card agent 400 generates a redirection request that identifies the funds deposit amount. The redirection request redirects the wallet client 316 to a financial institution server or a third party payment processing server, based on the payment mode selected, for authorization of a funds transfer, in the identified deposit amount. After the financial institution server (or payment processing server) authorizes the funds transfer in the identified deposit amount, the financial institution server (or payment processing server) provides the wallet client 316 with an authorization code, and then redirects the wallet client 316 back to the stored-value card agent 400. The wallet client 316 then provides the stored-value card agent 400 with the authorization code.

After receiving the authorization code from the wallet client 316, the stored-value card agent 400 sends the authorization code to a financial institution server that maintains a financial institution account (card agent's financial institution account) on behalf of the legal entity that is operating the stored-value card agent 400, and thereby effects settlement of the funds deposit from the wallet client user's desired payment mode to the card agent's financial institution account. The stored-value card agent 400 also updates the ledger 418 of the local stored-value card account that is associated with the user's wallet client 316, at step S522, to indicate that the deposit amount has been deposited to the wallet client user's local stored-value card account.

As will be apparent, the funds deposit procedure causes the stored-value card agent 400 to transfer the deposit amount to the card agent's financial institution account, and to update the current value of funds in the ledger 418 by the deposit amount, without transferring funds to the stored-value card network 500 and without updating the current value of funds in the remote stored-value card account of the stored-value card network 500. Therefore, the funds deposit procedure increases the current value of funds on deposit in the wallet client user's local stored-value card account by the deposit amount, but does not increase the current value of funds in the remote stored-value card account of the stored-value card network 500.

The stored-value card agent 400 may update the ledger 418 upon receipt of the authorization code, or may update the ledger 418 after receiving confirmation that the deposit amount has actually been deposited to the card agent's financial institution account. Therefore, although the financial institution server (or payment processing server) actually transfers the deposited amount to the card agent's financial institution account, the ledger 418 indicates that the deposited amount has been deposited to the wallet client user's local stored-value card account.

Method of Tracking Stored-Value Card Transactions: POS Transaction

After the wallet client user has registering with the stored-value card agent 400, the wallet client user may elect to use the local stored-value card account complete a financial transaction with a merchant via the stored-value card network 500. An example method of using the wallet client user's local stored-value card account to complete a financial transaction at a merchant's POS terminal 200 will now be discussed with reference to FIG. 6.

To complete the financial transaction, the wallet client user may use the wallet client 316 to connect to the stored-value card agent 400, and then invoke a transaction payment procedure, implemented by the card processor 426 of the stored-value card agent 400, to thereby initiate the delivery of a stored-value card token to the wallet client 316. In response, at step S600 the stored-value card agent 400 may establish an encrypted communications channel with the wallet client 316, and then use the wallet client 316 to prompt the wallet client user to authenticate to the stored-value card agent 400.

At step S602, the wallet client user inputs the user passcode into the wallet client 316, and the wallet client 316 transmits its device identifier (from the memory 314) and the user passcode to the stored-value card agent 400, via the encrypted communications channel. The stored-value card agent 400 authenticates the wallet client user by querying the ledger database 416 with the device identifier to locate the encrypted user passcode 422 that is stored in the local stored-value card account that is associated with the device identifier 420, and comparing the received encrypted user passcode against the encrypted user passcode 422.

If the wallet client user successfully authenticates to the stored-value card agent 400, at step S604 the card processor 426 may use the wallet client 316 to prompt the wallet client user to input the desired payment amount for the financial transaction, and optionally also the name of the merchant with which the wallet client user intends to complete the financial transaction. The specified payment amount may be equal to, or less than, the amount owed to the merchant for the transaction.

The wallet client user inputs the desired payment amount, and optionally the name of the merchant, into the wallet client 316. The wallet client 316 generates a transaction payment request message that specifies the payment amount (and the name of the merchant, if provided), and transmits the transaction payment request message to the card processor 426, at step S606. In response, at step S608 the card processor 426 determines, from the ledger 418 that is associated with the device identifier 420, the current balance value of funds that remain in the wallet client user's local stored-value card account, and confirms that the current balance value is at least equal to the payment amount specified in the payment request message.

If the current balance value is at least equal to the payment amount, at step S610 the card processor 426 may record particulars (e.g. payment amount, payment date) of the payment in the ledger 418, and reduces the current balance value in the ledger 418 by the payment amount. If the current balance value is at least equal to the payment amount, and the stored-value card agent 400 generated the device identifier 420 (i.e. the device identifier 420 was not generated by the stored-value card network 500 in response to stored-value card token request message transmitted to the stored-value card network 500 by the stored-value card agent 400), at step S612 the card processor 426 initiates an electronic funds transfer of the payment amount from the card agent's financial institution account to a financial institution account (card network's financial institution account) that is maintained by a financial institution on behalf of the legal entity that is operating the stored-value card network 500. The card processor 426 initiates the electronic funds transfer by transmitting to the stored-value card processing server 506, via the wide area computing network 108, a stored-value card token request message that identifies the payment amount (and optionally the name of the merchant) and that requests a single-use stored-value card token from the stored-value card network 500 for the payment amount.

In response, the stored-value card processing server 506 generates a redirection request that identifies the payment amount. The redirection request redirects the card processor 426 to a financial institution server or a third party payment processing server for authorization of a funds transfer, in the identified payment amount, from the card agent's financial institution account. After the financial institution server (or payment processing server) authorizes the funds transfer in the identified payment amount, the financial institution server (or payment processing server) provides the card processor 426 with an authorization code, and then redirects the card processor 426 back to the stored-value card processing server 506. The card processor 426 then provides the stored-value card processing server 506 with the authorization code.

After the stored-value card processing server 506 receives the authorization code from the card processor 426, at step S614 the stored-value card processing server 506 configures a new remote stored-value card account with the payment amount by generating a unique digital single-use stored-value card token (e.g. a unique stored-value card number), and saving the digital stored-value card token in the stored-value card database 502 in association with the payment amount. The stored-value card processing server 506 may also query the registered merchant database 504 with the name of the merchant to determine the unique merchant ID assigned to the merchant, and configure the new remote stored-value card account with the merchant ID by saving the merchant ID in the stored-value card database 502 in association with the stored-value card token.

After saving the digital stored-value card token in the stored-value card database 502, at step S616 the stored-value card processing server 506 transmits the single-use stored-value card token to the card processor 426. The stored-value card processing server 506 also uses the authorization code to effect settlement of the funds transfer of the payment amount from the card agent's financial institution account to the card network's financial institution account. However, since the payment amount constitutes the current value of funds that are on deposit in the remote stored-value card account that is maintained by a stored-value card network 500, in effect the funds (in the payment amount) are electronically transferred from the card agent's financial institution account to the remote stored-value card account.

The stored-value card processing server 506 may ensure that the stored-value card token is unique by employing any suitable database and/or cryptographic technique known in the art, including generating the stored-value card token from a pseudo-random number generator or noise generator. Alternately, or additionally, the stored-value card processing server 506 may save the stored-value card token in the stored-value card database 502 only after confirming that the stored-value card processing server 506 has not previously saved the stored-value card token in the stored-value card database 502.

After the card processor 426 receives the stored-value card token from the stored-value card processing server 506, at step S618 the card processor 426 initiates the electronic payment in the payment amount by transmitting the stored-value card token to the wallet client 316, over the encrypted communications channel. The wallet client 316 may save the stored-value card token in the memory 314 of the portable communications device 300.

Since the card processor 426 generates the stored-value card token request message on behalf of the wallet client user, and the stored-value card token request message (received from the card processor 426) does not include any information that can identify the wallet client user, the stored-value card token does not include any information that would allow a third party (other than the card processor 426) to identify the wallet client user.

Alternately, in the embodiment discussed above where the device identifier 420 was generated by the stored-value card network 500, at step S612 the card processor 426 initiates the electronic funds transfer of the payment amount from the card agent's financial institution account to the card network's financial institution account by transmitting to the stored-value card processing server 506, via the wide area computing network 108, a balance update message that identifies the payment amount and the device identifier 420 and that requests authorization to deposit funds in the payment amount to the remote stored-value card account that is associated with device identifier 420 (i.e. the stored-value card token).

After the stored-value card processing server 506 receives the authorization code from the card processor 426 as discussed above, at step S614 the stored-value card processing server 506 configures the remote stored-value card account with the payment amount by saving the payment amount in the stored-value card database 502 in association with the device identifier 420. The stored-value card processing server 506 also uses the authorization code to effect settlement of the funds transfer of the payment amount from the card agent's financial institution account to the card network's financial institution account. However, since the payment amount constitutes the current value of funds that are on deposit in the remote stored-value card account that is maintained by a stored-value card network 500, in effect the funds (in the payment amount) are electronically transferred from the card agent's financial institution account to the remote stored-value card account.

At step S616, the stored-value card processing server 506 transmits to the card processor 426 a deposit confirmation message confirming that the payment amount has been deposited to the remote stored-value card account that is associated with the device identifier 420. At step S618, the card processor 426 initiates the electronic payment in the payment amount by transmitting the deposit confirmation message to the wallet client 316.

After the wallet client 316 receives the single-use stored-value card token (or the deposit confirmation message), the wallet client user may command the wallet client 316 to transmit the stored-value card token to the merchant's POS terminal 200 to complete the financial transaction with the merchant. As non-limiting examples, the wallet client user may command the wallet client 316 to generate a visual representation of the stored-value card token (e.g. a two-dimensional bar code (QR code)) and to display the visual representation on the display 202 for capture by the token reader 209 of the POS terminal 200. Alternately, the wallet client user may command the wallet client 316 to wirelessly transmit the stored-value card token to the POS terminal 200 (for example via infrared, Bluetooth or NFC). The wallet client 316 transmits the stored-value card token to the POS terminal, at step S620.

After the POS terminal 200 receives the stored-value card token, the stored-value card token processor 216 of the POS terminal 200 generates a payment completion request that includes the stored-value card token (and optionally also includes the merchant's ID), establishes a secure communications channel with the stored-value card processing server 506, via the wide area computing network 102, and transmits the payment completion request to the stored-value card processing server 506 via the secure channel, at step S622.

After the stored-value card processing server 506 receives the payment completion request from the POS terminal 200, the stored-value card processing server 506 may validate the payment completion request by querying the stored-value card database 502 with the stored-value card token to determine the merchant ID that is associated with the remote stored-value card account, and comparing the merchant's ID included in the payment completion request (if included in the payment completion request) against the merchant ID associated with the remote stored-value card account.

The stored-value card processing server 506 then queries the stored-value card database 502 with the stored-value card token to determine the current balance of funds (i.e. the payment amount) on deposit in the remote stored-value card account. If the stored-value card agent 400 generated the device identifier 420, the stored-value card processing server 506 also deletes the remote stored-value card account (and the single-use stored-value card token) from the stored-value card database 502. Alternately, in the embodiment discussed above where the device identifier 420 was generated by the stored-value card network 500, the stored-value card processing server 506 maintains the remote stored-value card account in the stored-value card database 502, but reduces the current balance in the remote stored-value card account by the payment amount (i.e. resets the current balance associated with the device identifier 420 in the stored-value card database 502 to nil).

After the stored-value card processing server 506 deletes the remote stored-value card account (or reduces the balance thereof), the stored-value card processing server 506 issues an electronic funds transfer request to the financial institution server that maintains the card network's financial institution account. The electronic funds transfer request identifies the payment amount, and includes a request to transfer the payment amount from the card network's financial institution account.

After the financial institution server authorizes the funds transfer in the identified payment amount, the financial institution server provides the stored-value card processing server 506 with an authorization code. At step S624, the stored-value card processing server 506 provides the POS terminal 200 with the authorization code, via the wide area computing network 102, in response to the payment completion request. The merchant uses the authorization code to effect settlement of the funds transfer of the payment amount from the card network's financial institution account to a financial institution account that is maintained by the merchant's financial institution on behalf of the merchant.

If the payment amount received from the card network's financial institution account is less than the amount owed to the merchant for the transaction, the wallet client user may interface a payment card with the POS terminal 200 to provide the merchant with the balance owing for the transaction. The payment card processor 218 of the POS terminal 200 may then use account information received from the payment card to request authorization (via the payment network) for the balance owing.

Since the local stored-value card account associated with each wallet client 316 is not exposed to the stored-value card network 500, the wallet client 316 can receive and redeem stored-value card tokens without compromising the anonymity requirements of the stored-value card network 500.

Method of Tracking Stored-Value Card Transactions: Funds Withdrawal

After the wallet client user deposits funds to the local stored-value card account (and optionally uses the local stored-value card account to complete a financial transaction with a merchant via the stored-value card network 500), the wallet client user may elect to withdraw funds from the local stored-value card account. An example method of withdrawing funds from the wallet client user's local stored-value card account will now be discussed with reference to FIG. 7.

To initiate the funds withdrawal, the wallet client user may use the wallet client 316 to connect to the stored-value card agent 400, and then invoke a funds withdrawal procedure, implemented by the card processor 426 of the stored-value card agent 400, and thereby initiate a transfer of funds from the wallet client user's local stored-value card account to the wallet client user's financial institution account. In response, at step S700 the stored-value card agent 400 may establish an encrypted communications channel with the wallet client 316, and then use the wallet client 316 to prompt the wallet client user to authenticate to the stored-value card agent 400.

At step S702, the wallet client user inputs the user passcode into the wallet client 316, and the wallet client 316 transmits its device identifier (from the memory 314) and the user passcode to the stored-value card agent 400, via the encrypted communications channel. The stored-value card agent 400 authenticates the wallet client user by querying the ledger database 416 with the device identifier to locate the encrypted user passcode 422 that is stored in the local stored-value card account that is associated with the device identifier 420, and comparing the received encrypted user passcode against the encrypted user passcode 422.

If the wallet client user successfully authenticates to the stored-value card agent 400, the card processor 426 queries the ledger database 416 with the device identifier to locate the wallet client user ID 424 that is stored in the local stored-value card account that is associated with the device identifier 420. At step S704, the card processor 426 uses the wallet client 316 to prompt the wallet client user to input the desired withdrawal amount for the withdrawal request. The card processor 426 may also use the wallet client 316 to prompt the wallet client user to input a unique wallet client user ID, if the wallet client user did not previously provide a wallet client user ID at step S510.

The wallet client user inputs the desired withdrawal amount (and optionally the wallet client user ID, if required) into the wallet client 316. The wallet client 316 then generates a withdrawal request message that specifies the withdrawal amount (and optionally the wallet client user ID), and transmits the withdrawal request message to the card processor 426, at step S706. In response, at step S708 the card processor 426 determines, from the ledger 418 that is associated with the device identifier 420, the current balance value of funds that remain in the wallet client user's local stored-value card account, and confirms that the current balance value is at least equal to the withdrawal amount specified in the withdrawal request message.

If the current balance value is at least equal to the withdrawal amount, at step S710 the card processor 426 may record particulars (e.g. withdrawal amount, withdrawal date) of the funds withdrawal in the ledger 418, and reduces the current balance value in the ledger 418 by the withdrawal amount. At step S712, the card processor 426 issues an electronic funds transfer request to the financial institution server that maintains the card agent's financial institution account. The electronic funds transfer request identifies the withdrawal amount and the wallet client user ID 424, and includes a request to provide the wallet client user (via the wallet client user ID 424) with a session token authorizing the wallet client user to withdraw the withdrawal amount from the card agent's financial institution account.

After the card agent's financial institution server confirms that the current balance of funds in the card agent's financial institution account is at least equal to the withdrawal amount, at step S714 the card agent's financial institution server reduces the current balance in the card agent's financial institution account by the withdrawal amount (thereby placing the withdrawal amount on hold). At step S716, the card agent's financial institution server uses the wallet client user ID to send to the wallet client user a time-limited session token authorizing the wallet client user to withdraw the withdrawal amount from the card agent's financial institution account and deposit the withdrawn funds to the wallet client user's financial institution account. As a non-limiting example, the card processor 426 may authenticate to the card agent's financial institution server, and use Interac's eTransfer® e-mail money transfer service, made available through the card agent's financial institution server, to send to the wallet client user an e-mail message that includes a link (session token) that allows the wallet client user to deposit the withdrawal amount to the wallet client user's financial institution account.

Method of Tracking Stored-Value Card Transactions: Funds Transfer

After the wallet client user deposits funds to the local stored-value card account (and optionally uses the local stored-value card account to complete a financial transaction with a merchant via the stored-value card network 500), the wallet client user may elect to transfer funds from the local stored-value card account. An example method of transferring funds from the wallet client user's local stored-value card account to another consumer will now be discussed with reference to FIG. 8.

To initiate the funds transfer, the wallet client user (transferor) may use the wallet client 316 to connect to the stored-value card agent 400, and then invoke a funds transfer procedure, implemented by the card processor 426 of the stored-value card agent 400, and thereby initiate a transfer of funds from the transferor's local stored-value card account to a local stored-value card account or financial institution account of another consumer.

Steps S800 to S804 are substantially identical to steps S700 to S704. Therefore, in response, at step S800 the stored-value card agent 400 may establish an encrypted communications channel with the wallet client 316, and prompt the transferor to authenticate to the stored-value card agent 400. At step S802, the wallet client 316 of the transferor transmits its device identifier (from the memory 314) and the user passcode to the stored-value card agent 400, via the encrypted communications channel.

After the transferor successfully authenticates to the stored-value card agent 400, at step S804 the card processor 426 uses the wallet client 316 to prompt the transferor to input the desired transfer amount for the funds transfer. In response, the transferor inputs the desired transfer amount into the wallet client 316.

The card processor 426 also uses the wallet client 316 to prompt the transferor to provide contact particulars of the consumer (transferee) to whom the transferor wishes to transfer funds. If the transferee has already registered with the stored-value card agent 400 (i.e. the transferee's wallet client 316 has been assigned a device identifier 420 and has provided the stored-value card agent 400 with a wallet client user ID, via steps S500 to S512 of the user registration process), the transferor inputs the transferee's wallet client user ID into the wallet client 316. However, if the transferee has not already registered with the stored-value card agent 400, the transferor inputs into the wallet client 316 an electronic address (for example, an e-mail address, mobile device phone number, push notification service handle) that is uniquely associated with the transferee and which the stored-value card agent 400 can use to contact the transferee and advise the transferee of a pending funds transfer.

The wallet client 316 generates a funds transfer request message that specifies the transfer amount and the transferee's contact particulars (transferee wallet client user ID or transferee's electronic address, as applicable), and transmits the transfer request message to the card processor 426, at step S806. In response, at step S808 the card processor 426 determines, from the ledger 418 that is associated with the transferor's device identifier 420, the current balance value of funds that remain in the transferor's local stored-value card account, and confirms that the current balance value is at least equal to the transfer amount specified in the transfer request message.

If the current balance value is at least equal to the transfer amount, at step S810 the card processor 426 may record particulars (e.g. transfer amount, transfer date, transferee's identification particulars) of the funds transfer in the ledger 418, and reduces the current balance value in the ledger 418 by the transfer amount. The card processor 426 also queries the ledger database 416 with the transferee's identification particulars to determine whether the transferee has already registered with the stored-value card agent 400 (i.e. the ledger database 416 includes an entry with a wallet client user ID matching the transferee's identification particulars).

If the card processor 426 determines from the transferee's identification particulars that the transferee has already registered with the stored-value card agent 400, the card processor 426 may record particulars (e.g. transfer amount, transfer date, transferor's wallet client user ID) of the funds transfer in the ledger 418 that is associated with the transferee's wallet client user ID, and increases the current balance value in the latter ledger 418 by the transfer amount. The card processor 426 may then use the transferee's wallet client user ID to notify the transferee that funds in the transfer amount have been deposited to the transferee's local stored-value card account. The transferee wallet client user may withdraw all or part of the funds that are on deposit in the transferee's local stored-value card account, using the transferee's wallet client 316 as discussed above with reference to FIG. 7.

However, if the card processor 426 determines from the transferee's identification particulars that the transferee has not registered with the stored-value card agent 400, at step S812 the stored-value card agent 400 creates a new local stored-value card account by creating a new ledger 418 in the ledger database 416, updating the ledger 418 to indicate that the transfer amount has been deposited to the new local stored-value card account, generating a unique temporary device identifier 420, and configuring the new local stored-value card account by saving the temporary device identifier in the ledger database 416 in association with the new ledger 418, as discussed above. As noted above, in one example the temporary device identifier does not include any information that would allow a third party (i.e. other than the stored-value card agent 400) to identify the transferee.

After configuring the new local stored-value card account with the temporary device identifier, the stored-value card agent 400 may use the transferee's identification particulars to notify the transferee that the stored-value card agent 400 has created a new local stored-value card account for the transferee, and that funds have been deposited to the transferee's new local stored-value card account. The stored-value card agent 400 may also provide the transferee with particulars (e.g. transfer amount, transfer date, transferor's wallet client user ID) of the funds transfer.

The stored-value card agent 400 may use the transferee's identification particulars to provide the transferee with directions for withdrawing the funds from the new local stored-value card account. As a non-limiting example, the stored-value card agent 400 may use the transferee's identification particulars to send to the transferee an email or text message that includes a link that directs the transferee's mobile communications device 300 to the stored-value card agent 400. The message may also include a link that directs the transferee's mobile communications device 300 to download a copy of the wallet client 316 from an online applications server. In one example, the link to the stored-value card agent 400 includes the temporary device identifier and allows the transferee to authenticate to the stored-value card agent 400.

If the transferee selects the link to the stored-value card agent 400, the wallet client 316 installed on the transferee's mobile communications device 300 connects to the stored-value card agent 400 and invokes a finalize account procedure implemented by the wallet client 316.

The finalize account procedure is similar to the open account procedure discussed above with reference to FIG. 5, except that the stored-value card agent 400 has already initiated creation of the transferee's local stored-value card account (and has already updated the ledger 418 thereof to indicate that the transfer amount has been deposited to the transferee's local stored-value card account). Therefore, in response, the wallet client 316 generates a finalize account request message that includes the temporary device identifier, and transmits the finalize account request message to the stored-value card agent 400 via the wide area wireless communications network 106, at step S814.

After the stored-value card agent 400 receives the finalize account request message, at step S820 the stored-value card agent 400 locates the transferee's new local stored-value card account by querying the ledger database 416 with the temporary device identifier, generates a new unique device identifier 420, and configures the new local stored-value card account by saving the new device identifier 420 in the ledger database 416 in association with the new ledger 418, in replacement of the temporary device identifier. As above, in one example the new device identifier 420 does not include any information that would allow a third party (i.e. other than the stored-value card agent 400) to identify the transferee wallet client user.

Alternately, as discussed, instead of the stored-value card agent 400 generating the unique device identifier, in one embodiment, at step S816 the stored-value card agent 400 transmits to the stored-value card processing server 506, via the wide area computing network 108, a stored-value card token request message that identifies a nil payment amount and that requests a stored-value card token from the stored-value card network 500. In response, the stored-value card processing server 506 creates a new remote stored-value card account by generating a unique digital stored-value card token (e.g. a unique stored-value card number), and saving the digital stored-value card token in the stored-value card database 502 in association with the nil payment amount.

After saving the digital stored-value card token in the stored-value card database 502, the stored-value card processing server 506 transmits the stored-value card token to the stored-value card agent 400, at step S818. The stored-value card agent 400 configures the new local stored-value card account by saving the stored-value card token in the ledger database 416 as the new device identifier 420 in association with the nil payment amount and the new ledger 418, as discussed above.

After configuring the new local stored-value card account with the new unique device identifier 420, at step S822 the stored-value card agent 400 may establish an encrypted communications channel with the transferee's wallet client 316 over the wide area wireless communications network 106, and configure the transferee's wallet client 316 by transmitting the new device identifier to the wallet client 316, over the encrypted communications channel. The transferee's wallet client 316 may save the new device identifier 420 in the memory 314 of the portable communications device 300.

At step S822, the stored-value card agent 400 may also use the transferee's wallet client 316 to prompt the transferee wallet client user to provide a user passcode to subsequently authenticate the transferee wallet client user to the stored-value card agent 400. The stored-value card agent 400 may also prompt the wallet client user to provide a new unique electronic address (transferee wallet client user ID) that the transferee wallet client user would like to associate with the local stored-value card account and which the stored-value card agent 400 can use to contact the transferee wallet client user.

Similar to the sequence discussed above with reference to steps S508, S510, S512, the transferee wallet client user inputs the user passcode into the transferee's wallet client 316, and the wallet client 316 transmits the user passcode to the stored-value card agent 400, via the encrypted communications channel. If the transferee wallet client user elects to provide the stored-value card agent 400 with a new transferee wallet client user ID, the transferee wallet client user may also input the new transferee wallet client user ID into the transferee's wallet client 316, and the wallet client 316 may then transmit the new transferee wallet client user ID to the stored-value card agent 400, via the encrypted communications channel.

The stored-value card agent 400 then configures the new local stored-value card account with the user passcode (and the new transferee wallet client user ID 424, if provided) by encrypting the user passcode and saving the encrypted user passcode 422 (and the new transferee wallet client user ID, if provided) in the ledger database 416 in association with the ledger 418 and the new device identifier 420. The finalize account procedure terminates after the new local stored-value card account is configured with the new device identifier 420 and the encrypted user passcode 422 (and optionally with the new transferee wallet client user ID 424). The transferee wallet client user may then withdraw all or part of the funds that are on deposit in the transferee's local stored-value card account, using the transferee's wallet client 316 as discussed above with reference to FIG. 7.

Although the foregoing method of tracking stored-value card transactions has been described herein as involving a sequence for depositing funds to a local stored-value card account (FIG. 5), followed by a sequence for completing a financial transaction at a POS terminal 200 via the stored-value card network 500 using funds on deposit in the local stored-value card account (FIG. 6), followed by a sequence for withdrawing funds from the local stored-value card account (FIG. 7) and/or a sequence for transferring funds from one local stored-value card account to another local stored-value card account (FIG. 8), the method of tracking stored-value card transactions is not limited to this particular order. Instead, the foregoing sequences may be performed in any order, and repeated any number of times, subject to the available balance value of funds in the respective local stored-value card accounts.

Figure 5:
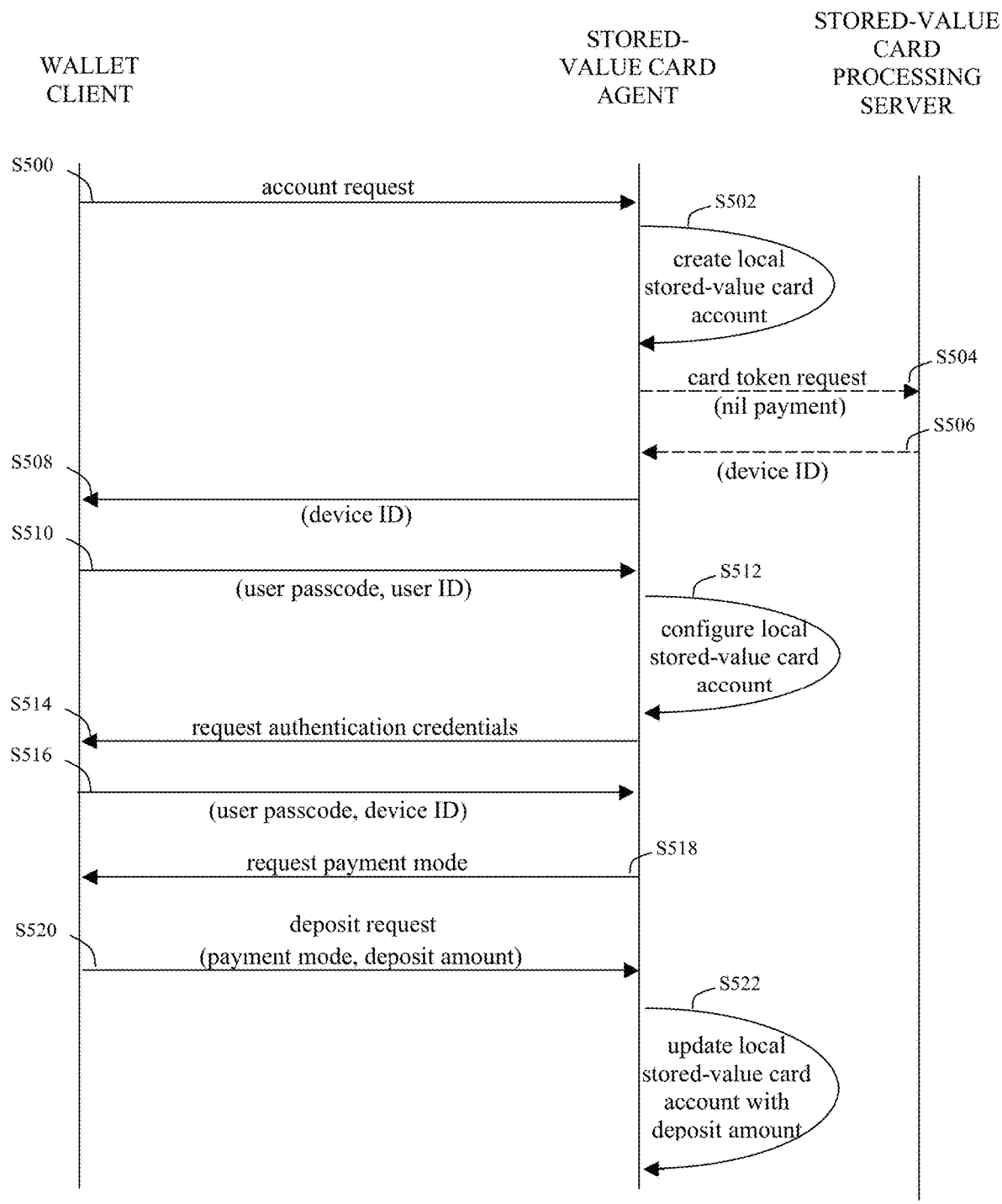
FIG. 5 is a message flow diagram depicting a method of depositing funds to a local stored-value card account that is maintained by the stored-value card agent.

For example, another embodiment of the method of tracking stored-value card transactions involves one or more sequences for transferring funds from one local stored-value card account to another local stored-value card account (FIG. 8), followed by one or more sequences for withdrawing funds from one of the local stored-value card accounts (FIG. 7) and/or one or more sequences completing a financial transaction at a POS terminal 200 via the stored-value card network 500 (FIG. 6) and/or one or more sequences for depositing additional funds to the local stored-value card accounts (FIG. 5).

Since the ledger database 416 and local stored-value card accounts are maintained separate from the stored-value card network 500, the consumer can withdraw funds from the stored-value card system and transfer funds to other consumers via the stored-value card system (subject to the balance of funds indicated in the associated ledger 418) notwithstanding that the stored-value card network 500 is prohibited from maintaining any information that can be used to identify the consumer and notwithstanding that, therefore, the stored-value card network 500 itself does not have the technological infrastructure to allow consumers to withdraw their funds from the stored-value card network.

The invention claimed is:

1. A stored-value card system comprising:
a point-of-sale terminal;

a communications device; and
a stored-value card agent,
wherein the stored-value card agent is configured to:
  receive, from the communications device, a message identifying a payment amount;
  transmit, to a stored-value card network, a request message including the payment amount;
  receive a confirmation of the stored-value card network associating the payment amount with a stored-value card account maintained by the stored-value card network; and
  transmit a token to the communications device, and
wherein the point-of-sale terminal is configured to:
  transmit, to the stored-value card network, a completion message including the token and excluding the payment amount; and
  receive, from the stored-value card network, an authorization code confirming authorization of a funds transfer in the payment amount.

2. The stored-value card system according to claim 1, wherein the stored-value card agent includes a memory storing a ledger database, the ledger database includes a plurality of ledgers, and the stored-value card agent is configured to receive an account request from the communications device, add a new ledger to the ledger database, generate a device identifier, and uniquely associate the device identifier with the new ledger in the ledger database.

3. The stored-value card system according to claim 2, wherein the stored-value card network is configured to generate the token and to uniquely associate the token with the stored-value card account in response to the request message, and the confirmation of the stored-value card network includes the token.

4. The stored-value card system according to claim 3, wherein the token is distinct from the device identifier, and the request message excludes the device identifier.

5. The stored-value card system according to claim 1, wherein the stored-value card agent includes a memory storing a ledger database, the ledger database includes a plurality of ledgers, and the stored-value card agent is configured to receive an account request from the communications device, transmit a nil payment amount to the stored-value card network, receive a device identifier from the stored-value card network in response to the nil payment amount, and uniquely associate the device identifier with an existing one of the ledgers in the ledger database.

6. The stored-value card system according to claim 5, wherein the stored-value card network is configured to generate the device identifier and to uniquely associate the device identifier with the stored-value card account in response to the nil payment amount, and the confirmation of the stored-value card network excludes the device identifier.

7. The stored-value card system according to claim 6, wherein the token is indistinct from the device identifier, and the request message includes the device identifier.

8. The stored-value card system according to claim 1, wherein the stored-value card agent includes a memory storing a ledger database, the ledger database includes a plurality of ledgers, one of the ledgers stores a current balance value and a device identifier, and the stored-value card agent is configured to:
  receive the device identifier from the communications device;
  in response to the message identifying a payment amount, locate the one ledger in the ledger database via the device identifier;
  determine the current balance value in the one ledger;
  prior to transmitting the request message, confirm that the current balance value is at least equal to the payment amount; and
  reduce the current balance value in the one ledger by the payment amount.

9. The stored-value card system according to claim 8, wherein the one ledger stores a credential, and the stored-value card agent is configured to:
  receive a passcode from the communications device; and
  prior to locating the one ledger, confirm that the passcode corresponds with the credential stored in the one ledger.

10. A method of withdrawing funds from a stored-value card network, the method comprising:
  a stored-value card agent receiving, from a communications device, a message identifying a payment amount;
  the stored-value card agent transmitting, to the stored-value card network, a request message including the payment amount;
  the stored-value card agent receiving a confirmation of the stored-value card network associating the payment amount with a stored-value card account maintained by the stored-value card network;
  the stored-value card agent transmitting a token to the communications device;
  a point-of-sale terminal transmitting, to the stored-value card network, a completion message including the token and excluding the payment amount; and
  the point-of-sale terminal receiving, from the stored-value card network, an authorization code confirming authorization of a funds transfer in the payment amount.

11. The method according to claim 10, wherein the stored-value card agent includes a memory storing a ledger database, the ledger database includes a plurality of ledgers, and the method further comprises the stored-value card agent:
  receiving an account request from the communications device;
  adding a new ledger to the ledger database;
  generating a device identifier; and
  uniquely associating the device identifier with the new ledger in the ledger database.

12. The method according to claim 11, further comprising the stored-value card agent generating the token and uniquely associating the token with the stored-value card account in response to the request message, and the confirmation of the stored-value card network includes the token.

13. The method according to claim 12, wherein the token is distinct from the device identifier, and the request message excludes the device identifier.

14. The method according to claim 10, wherein the stored-value card agent includes a memory storing a ledger database, the ledger database includes a plurality of ledgers, and the method further comprises the stored-value card agent:
  receiving an account request from the communications device;
  transmitting a nil payment amount to the stored-value card network;
  receiving a device identifier from the stored-value card network in response to the nil payment amount; and
  uniquely associating the device identifier with an existing one of the ledgers in the ledger database.

15. The method according to claim 14, further comprising the stored-value card agent generating the device identifier and uniquely associating the device identifier with the stored-value card account in response to the nil payment amount, and the confirmation of the stored-value card network excludes the device identifier.

16. The method according to claim 15, wherein the token is indistinct from the device identifier, and the request message includes the device identifier.

17. The method according to claim 10, wherein the stored-value card agent includes a memory storing a ledger database, the ledger database includes a plurality of ledgers, one of the ledgers stores a current balance value and a device identifier, and the method further comprises the stored-value card agent:
- receiving the device identifier from the communications device;
- in response to the message identifying a payment amount, locating the one ledger in the ledger database via the device identifier;
- determining the current balance value in the one ledger;
- prior to transmitting the request message, confirming that the current balance value is at least equal to the payment amount; and
- reducing the current balance value in the one ledger by the payment amount.

18. The method according to claim 17, wherein the one ledger stores a credential, and the method further comprises the stored-value card agent:
- receiving a passcode from the communications device; and
- prior to locating the one ledger, confirming that the passcode corresponds with a credential stored in the one ledger.

* * * * *